United States Patent [19]

Gits

[11] 4,415,167
[45] Nov. 15, 1983

[54] ASSEMBLED MULTI-COMPONENT SEAL

[76] Inventor: Norbert W. Gits, 6417 Blackhawk Trail, Indian Head Park, Ill.

[21] Appl. No.: 449,188

[22] Filed: Dec. 13, 1982

[51] Int. Cl.³ .............................................. F16J 15/34
[52] U.S. Cl. ...................................... 277/88; 277/42; 277/43
[58] Field of Search .................. 277/42, 43, 81 R, 88, 277/89

[56] References Cited

U.S. PATENT DOCUMENTS

| | | | |
|---|---|---|---|
| 2,899,219 | 8/1959 | Payne | 277/43 |
| 2,994,547 | 8/1961 | Dolhun | 277/88 |
| 3,355,178 | 11/1967 | Hornaday | 277/88 |
| 3,457,870 | 7/1969 | Sleeter | 277/88 |
| 3,567,230 | 9/1969 | Gits | 277/89 |
| 4,095,807 | 6/1978 | Jandt et al. | 277/88 |
| 4,103,906 | 8/1978 | Gits | 277/42 |

*Primary Examiner*—Robert I. Smith
*Attorney, Agent, or Firm*—James T. FitzGibbon

[57] ABSTRACT

In a rotary end face seal for fluid pumps or the like including a housing adapted to be received within a seal counterbore, a primary seal ring with an end face portion adapted to engage a mating ring, a spring element urging the primary seal ring axially outwardly of the housing in a first direction, and an elastomeric sleeve providing a secondary seal between the housing and the seal ring. The seal also includes a seal ring holder and drive unit which includes radially inwardly directed drive surfaces adapted to engage counterpart outwardly directed drive faces on the primary seal ring, with both of the ring and the drive unit surfaces extending axially to permit free but limited axial movement of said primary seal ring. A tubular shroud is provided for the spring, and the sleeve is held in fluid-tight relation to the ring and the housing by engagement between one end portion of the drive ring and by engagement with the spring shroud on another diameter of the sleeve, the drive ring being held in the position of engagement and against axial outward movement by engagement between its other end surface portion and a locking rib extending inwardly from an inner diameter portion of the housing.

16 Claims, 3 Drawing Figures

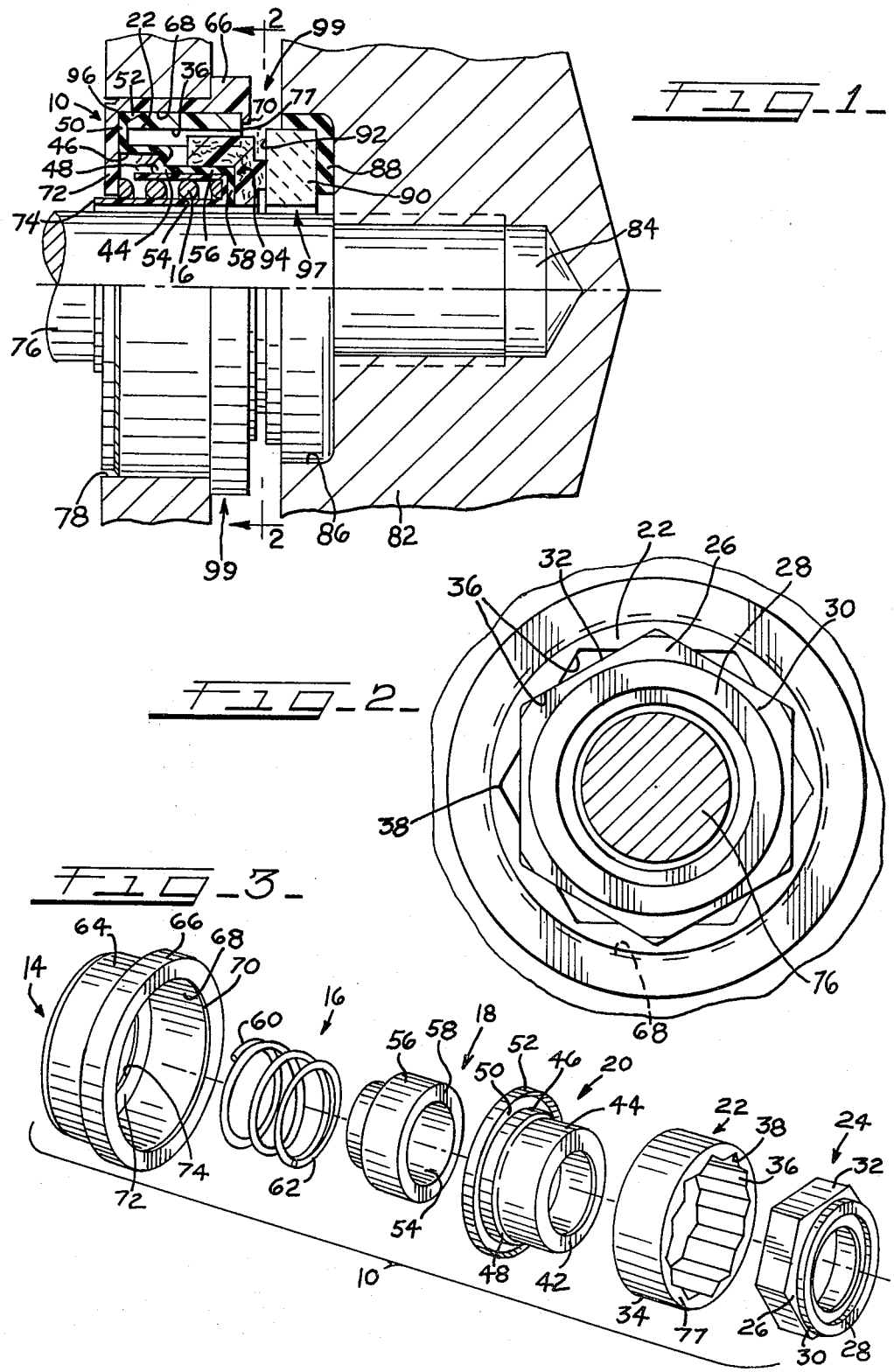

ASSEMBLED MULTI-COMPONENT SEAL

The present invention relates generally to fluid seals, and more particularly to special purpose fluid seals adapted to retain water, liquid chemicals, collants or other solution, emulsions, or the like within a sealed region, and to provide a fluid tight interface permitting relative movement between two portions of the sealed assembly.

Typically, seals of the present invention are advantageously used in water pumps and pumps used in the chemical process and related industries.

Prior art seals are known for the general purpose for which the seal of the present invention is adapted, however, the present invention relates to a seal constructed of certain materials and having certain features of construction and arrangement which renders it able to be manufactured simply with inexpensive equipment at low cost, to provide a highly durable seal which is easy to assemble reliably.

According to the invention, a first basic seal design can be made, and components thereof may then be made of different materials for specialized applications, without the requirement of making the entire seal from such material. In other words, the primary seal ring can be made from one or more materials adapted to cooperate with a mating ring to provide the primary seal and the remaining elements of the seal can be made from the same or different materials, as indicated by the intended application or use of the seal assembly.

Specifically, the housing, drive member and spring shroud are preferably made of synthetic resin materials which are resistant to corrosive environments wherein metal seals would rapidly fail, and the sleeve acting as the secondary seal is preferably made from a fluoroelastomer or other corrosion-resistant synthetic rubber. Plastics also offer important cost advantages, and may be selected so as to be inert to the sealed fluid, which may be a strong solvent, an acid, base, or other corrosive material. While various different plastics and rubbers may be used, polyester resins, plastics and fluoroelastomers are preferred for most applications.

In particular, the seal of the present invention is a so-called end face seal, that is, where the primary seal or the seal between relatively rotatable parts is made between a radially extending, axially directed end face of a primary seal ring member and a counterpart surface on an opposed element, normally referred to as a mating ring.

In end face seals, there is a requirement for a primary seal to be fluid tight. Further, there is a requirement that whatever torque driving is necessary be transmitted from the machine member in which one portion of the seal is received to the primary sealing end face so that friction developed there will not impede free rotation of the one seal part relative to the other. Still further, there is a requirement for applying and maintaining a controllable magnitude on the end face of the seal. This is the force which urges the primary seal ring axially against the mating ring and permits whatever relative axial movement of these parts occurs by reason of working clearances in the machine parts, or axial end play during operation, as well as by reason of tolerance differences in assembly of the parts, to be accommodated without leakage.

Still further, there is a requirement for one or more secondary seals to be fluid tight. "Secondary" seals are those which prevent fluid leakage between portions of the seal which do not move circumferentially or rotationally with respect to each other. Thus, axial movement of the primary seal ring with respect to the casing portion of the seal must also be sealed against fluid leakage, even though this involves primarily axial end play movement rather than circumferential or rotational movement. Still further, an outside or mounting diameter fluid-tight secondary seal must be provided.

Seals of the type with which the invention is concerned is that of ease of assembly within a manufacturing facility, for purposes of low cost and increased reliability of manufacture. Still further, if the seal is capable of both easy and reliable installation in its intended application, further advantages result. According to the invention, a unitized assembled seal is provided which includes a number of components adapted to achieve the foregoing and other structural and functional characteristics, and to do so economically and reliably. While a number of seals having the general characteristics of the present seal are found in the prior art, such seals have always been capable of improvement in one or more important areas, and accordingly, it is an object of the present invention to provide an improved fluid seal.

Still further, it is an object of the present invention to provide a multi-part assembled seal adapted for cooperation with a mating ring, which seal is easy and reliable to manufacture, and which may be manufactured by simple, accepted techiques.

A further object of the invention is to provide a seal having parts of which are constructed and arranged so that proper assembly can be accurately gauged during manufacture.

A still further object of the invention is to provide a seal which includes a sleeve type secondary seal adapted to roll and unroll axially at least in part during operation, and wherein the sleeve is reliably secured by a simple mechanism during assembly.

Yet another object of the invention is to provide an assembled multi-part seal which includes a primary seal ring able to be made from a number of different materials without loss of effectiveness, and wherein the primary seal ring may be made fully interchangeable with its counterparts made from other materials.

Another object of the invention is to provide a reliable assembled seal which is of low cost to manufacture, and which includes readily available components which are easy to select and calibrate for proper application.

A further object of the invention is to provide a seal of the foregoing type wherein the member applying the axial end face load will apply a relatively low force at a generally linear spring rate, and which is tolerant of significant axial end play in use.

A still further object of the invention is to provide a seal having a simple and reliable torque transmission arrangement which also facilitates assembly at the factory.

The foregoing and other objects and advantages of the invention are achieved in practice by providing a seal having a primary seal ring with a seal band lying on an axial end face portion of the ring, a coil spring, a seal ring holder having a contoured surface for reception of the priamry seal ring to permit free relative axial movement, within limits, of said primary ring, a sleeve type secondary flexible seal, a spring shroud surrounding the spring, and an outer case serving to enclose these parts and act as a seal mounting portion for reception in the counterbore, with the sleeve type secondary seal being pressed into fluid tight sealing engagement with both the housing and the primary seal ring, by the shroud and the seal ring holder, respectively, and by arranging such components in an easy-to-assemble form for reduced cost, improved quality production.

The exact manner in which these and other objects and advantages of the invention are achieved in practice will be more clearly apparent when reference is made to the following detailed description of the preferred embodiments of the invention set forth by way of example, and to the accompanying drawings, wherein like reference numbers indicate corresponding parts throughout.

BRIEF DESCRIPTION OF THE DRAWINGS

FIG. 1 is a side view, partly in section and partly in elevation, showing the seal of the invention in an installed position of use within a machine assembly, such as water pump or the like;

FIG. 2 is a vertical sectional view of the end face seal unit of the invention, taken along lines 2—2 of FIG. 1; and FIG. 3 is an exploded perspective view showing the principal components of the seal, namely, the outer housing, a spring and a spring shroud, the resilient secondary seal sleeves, the seal ring holder and torque transmitting member and the primary seal ring itself.

DESCRIPTION OF THE PREFERRED EMBODIMENTS OF THE INVENTION

While it will be understood that seals made according to the invention may vary in detail from the illustrated form of seal and that the seal may be used in various applications, the form of seal described is one wherein the seal assembly is seated at its outer diameter within a counterbore in a stationary machine member, with a shaft passing through and being spaced apart from the inner diameter of the seal, and with the mating ring being carried by a relatively rotatable member affixed to an end portion of the shaft.

Referring now to the drawings in greater detail, FIG. 1 shows the seal of the invention generally designated 10 to be received within a counterbore 12 in a machine member, and to include a number of principal components, the basic features of which appear in FIG. 3.

Thus, referring particularly to FIG. 3, the seal unit 10, before assembly, includes an outer housing or mounting portion 14, an axially acting coil spring 16, an annular spring shroud 18, an elastomeric secondary sealing sleeve 20, a seal ring shoulder or drive member 22 and a primary end face seal ring 24. The seal ring 24 includes a body 26 of generally annular form, having a lapped, polished or finely finished end face seal band 28 formed on a nose element 30. The seal ring 24 is of generally annular form, but portions of its outermost surface are formed by a plurality of flats 32, giving the outermost surface the profile of a hexagon, for example. The seal ring 24 is slidably received in a seal ring holder which also acts as a torque transmission element 22, which incluces a smooth, cylindrical, axially extending outer surface 34, and an inner surface defined by a plurality of angularly spaced flats 36 meeting at a plurality of points 38. As shown, the interior is in the form of a "12 point" surface, that is, it resembles the interior of a socket wrench adapted to be used with hexagonal-head bolts, thus enabling the unit 22 to interfit with the ring 24 in a driving relation, which still permits free but limited axial movement.

Referring now to the sleeve 20, this unit is made from a thin elastomer and is shown to include a forwardly directed, radial face 42, reduced and enlarged diameter sleeve sections 44, 46, respectively jointed by a flexible diaphragm section 48. The outermost diamer of the sleeve 20 is comprised of radial and axial formations 50, 52 on the sleeve 20, to aid in securing the sleeve in place, as will appear.

The spring shroud 18 includes a cylindrical, radially inner wall portion 54 and a radially outer cylindrical wall 56 of reduced length, with the two walls 54, 56 being joined by a radial wall 58, which closes off one end of the shroud and leaves the opposite end tehreof open for reception of the coil spring 16. The spring 16 includes inner and outer ends 60, 62.

The principal portions of the housing 14, as shown in FIG. 3, include an outer or mounting diameter 64, an enlarged diameter shoulder 66, an inwardly directed cylindrical surface 68, a circumferential rib 70 and an end wall 72 terminating, in an inner diameter surface 70, defining an opening for a shaft 76.

FIG. 1 shows the seal assembly 10 in an installed position in a counterbore 78 formed in a machine member 80. FIG. 1 also shows that a machine part such as an impeller 82 is keyed over the end portion 84 of the shaft 86, and that the impeller 82 includes a counterbore 86 in which are disposed a mating ring mounting gasket 88 and a seal mating ring 90 having an axial end face 92 serving as the wear surface. FIG. 1 also shows that, in the installed position, considering the right hand side of the assembly 10 to be the axially outer portion of the seal, the radially inner wall 54 of the spring shroud has an end portion extending to or beyond the end wall 72 of the housing 14.

An annular seat generally designated 94 is formed by radial and axial inner surfaces defining a recess in the primary seal ring 24. The end face 58 and the outer cylindrical surface 56 of the spring shroud cooperate with the seat 94 secure the radial face and the reduced diameter sleeve portions 42, 42 of the sleeve 20 into fluid-tight sealing engagement with the primary seal ring 24.

The radial and axial formations 50, 52 extending outwardly from the enlarged diameter portion 46 of the sleeve 20 are secured respectively against the inner interior surface of the housing end wall 72 and the radially inwardly directed surface 68 on the housing 14 by snug contact with the end wall 96 of the drive member 22. According to the invention, the drive member is sized so as to be held snugly in a seated position between the housing end wall 72 and the rib 70.

Thus, the primary seal ring 24 is free to move axially inwardly in use, with its outer surface or flats 32 sliding within the counterpart surfaces 36 on the drive ring 22, against the compressive force of the spring. As such axial movement takes place, the transition portion 48 of the sleeve rolls or buckles to accommodate such end play. While the sleeve and the spring length prevent undue outward movement of the primary seal ring, compression of the spring and engagement between end surface of the outer spring shroud wall 56 against the inner face of the housing end wall 72 of the housing limits undue inward movement of the primary ring 24, with movement intermediate these limits being controlled by the spring 16 whose ends 60, 62 respectively abut the interior surface of the end wall 72 and the inside of the radial wall or bight portion of the spring shroud 58.

Referring now to another important feature of the invention, the components of the unitary seal are constructed and arranged for rapid factory assembly. Thus, preferably, the elastomeric secondary seal sleeve is positioned with its smaller end 44 overlying the surface 58 of the shroud 18, and with the shroud wall 58 abutting the sleeve end 42. Thereupon, the shroud-sleeve subassembly is pressed axially into the recess in the primary ring so that there is a snug seal between the seat 94 and the portions 42, 44 of the sleeve. Next, the spring 16 is inserted with its axially outer or forward end 62 abutting the interior surface of the wall 58 on the shroud 18. Then, the subassembly just described is emplaced within the housing 14 such that the portions 50 52 of the sleeve 20 respectively abut or lie adjacent the interior surface of the end wall 72 and the inner surface 68 of the housing 14. At this point, the drive unit 22 is slipped over the ring 24 and pressed to a seated position within the housing 14.

As the drive unit 22 "bottoms out", in the housing, pressing or pinching the surface 50, 52 of the sleeve 20 into snug seating engagement with the housing, the axially outermost end face 77 of the drive unit 22 snaps into place and is held there by the locking rib or bead 70. While this rib or bead 70 is shown as a continuous circumferential bead, it may also be discontinuous or have spaced apart elements.

Assembly in the foregoing manner provides excellent reliability because the parts are pressed together to a definite "bottomed out" position. Thus, whether assembled by machine or by hand, when the respective parts are fully seated, a great increase in resistance to movement is felt, and the assembler knows with certainty that the parts are properly positioned. In this connection, by "reliability" of assembly is meant that it is possible to determine that assembly is correct when made, rather than requiring post assembly inspection, analysis or possible failure in the field.

When it is desired to install the seal in use, the manufacturer of the sealed part merely places the gasket 88 and the mating ring 90 within a counterbore, in an impeller 82, for example, inserts the housing 14 containing the entire seal unit 10 within an oppositely directed counterbore and press fits the unit until the shoulder 66 engages the appropriate machine surface.

In the illustrated example, once the seal assembly 10 emplaced in the seal-receiving counterbore, and the mating ring is positioned in its counterbore, the impeller is press fit onto the shaft to a fully seated position, and the installation is complete. As known to those skilled in the art, the parts are dimensioned so that such assembly provides an initial compression of the spring 16 sufficient to provide a desired end face load, within tolerances permitted by the specification. In use, the spring provides sufficient axial end face load to provide an effective primary seal, without overloading the seal to cause excessive wear as the seal reaches a compressed or "minimum installed" height position; it also is designed to provide at least the minimum required axial selng designed to provide at least the minimum required axial sealing force where tolerances or axial runout indicated operation at or near the maximum permissible "installed height".

Because of the shape of the secondary seal sleeve, axial movement does not cause either measurable stretching or compression of the sleeve, and thus dynamic end face seal load is accounted for substantially entirely by the spring. The design permits the seal to move between extended and retracted positions (phantom lines in FIG. 1) without undue concentration of wear. Moreover, the design is such that a wide variety of elastomers may be used, particularly including those having relatively low tolerance for elongation, such as fluoroelastomers or the like.

In the foregoing description, a form of seal is shown wherein the application is a "water" pump or the like, with the portions lying along the shaft being the interior or sealed regions 97, and with the shaft being journaled by bearings, as is known to those skilled in the art. The fluid to be pumped lies in an exterior area, generally designated 99 in FIG. 1.

Whereas automotive or like "water" pumps are a suitable application for a seal of the invention, it being understood that by "water" is meant a mixture of water, glycol, antifreeze, various inhibitors and/or indicators, etc., the seal is also very adaptable for use in hostile chemical environments, such as those wherein acids, bases, strong solvents, etc., are the fluids being sealed. According to the invention, the seal may be made of a wide variety of materials, depending upon the intended application, without altering the design. Preferably, the gasket 88 is a chemically resistant synthetic elastomer, a fluoroelastomer such as "Viton"; the sleeve 20 may also be made of this elastomer.

The outer housing 14 is preferably made from a synthetic resin material, such as a polyester having a desired chemical resistance. This provides a stiff, but resilient sealing action for the rib or bead 70, together with a lubricous outer surface facilitating easy installation. The drive unit 22 is also preferably made from a lubricous synthetic resin material, such as a polyester, and the spring shroud 58 may be made of similar material.

The primary seal ring and the mating ring are made from familiar materials, depending upon the application. Typically, the mating ring 90 may be made from a ceramic material, and the primary seal ring from a carbon graphite or like material having hardness and lubricity. The spring may be stainless steel, carbon steel or other alloy.

In certain applications, the mating ring may be brass or bronze, or a material of the type known to those skilled in the art, and the primary seal ring may be made from a thermosetting resin such as a phenolic or the like, usually impregnating a cloth or other fiber matrix material. Whereas the choice of materials is not critical to the success of the invention, the design is such that a wide variety of materials may be used, requiring minimum specialty work or redesign for use in different applications.

While the illustrated form of seal shows a mating ring 90 which is received and centered with respect to the impeller, and in which the gasket or seating member 88 is of L-shaped half section adapted for reception in a counterbore, it is known that the mating ring 90 or its equivalent may be shaft mounted, as by being press fit over the shaft or secured to the shaft by a gasket of annular form and rectangular, circular, or L-shaped half section.

In addition, the arrangement of the parts may be merely reversed, so that the housing would seal on its inner diameter, with the spring and shroud lying adjacent and just spaced apart from an outside diameter of the machine instead of an inside diameter; such construction would also be considered as falling within the scope of the invention. In otherw words, according to the invention, the lubricant may lie inside or outside of the seal, with the fluid lying in the other of the regions.

It will thus be seen that the present invention provides a novel seal unit having a number of advantages and characteristics, including those pointed out above and others which are inherent in the invention. A preferred embodiment of the invention having been described by way of illustration, it is anticipated that changes and modifications of the described seal unit will occur to those skiled in the art and that such changes and modifications may be made without departing from the spirit of the invention or the scope of the appended claims.

I claim:

1. A rotary end face seal unit comprising, in combination, a seal housing having a first, outer surface portion adapted for reception into a machine member and an inner diameter adapted to receive a seal ring drive unit, said housing further including, at one end thereof, a radially inwardly extending end wall with an interior wall surface, and adjacent the other end thereof, a stiff but resilient, radially inwardly directed locking rib, a drive member having axially inner and outer end faces and a contoured inner surface adapted to mate with the outer surface of an associated primary seal ring in driving engagement, and to permit said seal ring to slide axially thereof, a primary seal ring disposed within at least a portion of said drive member and having driving surfaces corresponding to and directed oppositely to counterpart drive surfaces on said drive member, an exterior end face seal band forming a pair of said primary rings, said primary ring futher including an annular seat for locating a spring shroud, an elastomeric secondary sealing sleeve having axially inner, intermediate, and outer portions, an axially acting coil spring, and a shroud enclosing said spring on its inner diameter, on one end thereof and at least a portion of its outer diameter, said sleeve being held into fluid-tight sealing relation at its axially inner end between said housing end wall and said inner end wall of said drive member, and at its axially outer end between a portion of said spring shroud and said annular seat on said seal ring, said sleeve further having an intermediate portion lying adjacent a portion of said spring shroud and being adapted for a rolling or buckling action to permit free but limited axial movement of said primary seal ring relative to said housing and drive member.

2. A rotary end face seal as defined in claim 1, wherein said locking rib is a continuous rib extending circumferentially about said housing and forming a part of the axially outer end thereof.

3. A rotary end face seal as defined in claim 1, wherein said radially inwardly directed portion of said drive member comprises a plurality of axially extending flat surface portions arranged in the form of a regular polyhedron.

4. A rotary end face seal as defined in claim 1, wherein said outer surface of said primary seal ring includes a plurality of axially extending flat surfaces joined to one another along common edge portions, said surfaces being in the form of a regular polyhedron.

5. A rotary end face seal as defined in claim 1, wherein said contoured inner surface of said drive member comprises a surface, when viewed in end section, of regular polygonal shape having twelve exterior and twelve interior points, and wherein said driving surfaces on said primary seal ring, viewed in end section, comprise a regular hexagon, with said drive surfaces on said drive member and said primary seal ring being constructed and arranged so as to be separated from one another by a slight working clearance.

6. A rotary end face seal as defined in claim 1, wherein said housing further includes an exterior shoulder portion having an axially inwardly directed surface adapted to abut a portion of an associated machine member to determine the installed position of said seal unit.

7. A rotary end face seal as defined in claim 1, wherein said spring shroud, said drive member, and said housing are constructed of a stiff but resilient synthetic plastic material.

8. A rotary end face seal as defined in claim 1, wherein the radially inner portion of said spring shroud extends axially through a central opening in said housing said opening being formed by the inside diameter of said housing end wall.

9. A rotary end face seal as defined in claim 1, wherein said sleeve is made from a fluoroelastomer.

10. A rotary end face seal as defined in claim 1, wherein said annular seat in said primary seal ring is defined by a pair of annular walls meeting each other at right angles and being substantially axially and radially extending walls.

11. A rotary end face seal as defined in claim 1 wherein said spring shroud, said drive member and said housing are constructed from a synthetic polyester resin material.

12. An improved seal as defined in claim 11 wherein said sleeve is made from a fluoroelastomer.

13. An improved seal as defined in claim 11 wherein said drive surface on said ring and drive units, when viewed in end section, are in the shape of a regular polygon, said surfaces being spaced apart from each other in use by a slight working clearance.

14. A rotary end face seal as defined in claim 1 wherein portions of said seal adapted to be exposed to the seal fluid are made from corrosion resistant synthetic materials, including synthetic resinous materials and elastomeric materials.

15. A sealed mechanism comprising, in combination a first, relatively stationary part having a seal receiving opening therein and a seal as defined in claim 1 received therein, said mechanism further including a relatively rotatable part disposed on a shaft, said shaft having a portion extending through said seal unit, said relatively rotatable part further including means for receiving a mating ring, and a mating ring positioned by said receiving means, and said receiving means including a mounting gasket, said mating ring having an axially directed end face portion engaging said seal band of said end face seal in fluid-tight sealing engagement.

16. In a rotary end face seal having a housing adapted to be received within a seal counterbore, a primary seal ring having an end face portion adapted to engage a mating ring, a spring element urging said primary seal ring axially outwardly of said housing in a first direction, and an elastomeric sleeve providing a secondary seal between said housing and said seal ring, the improvement comprising a seal ring holder and drive unit which includes radially inwardly directed drive surfaces adapted to engage counterpart outwardly directed drive faces on said primary seal ring, counterpart drive surfaces on said ring, both of said ring and drive unit surfaces extending axially to permit free but limited axial movement of said primary seal ring, and a tubular spring shroud, said sleeve being held in fluid-tight relation to said ring and said housing by engagement between one end portion of said drive ring on one portion of said sleeve, and by engagement with said spring shroud on another diameter of said sleeve, said drive ring being held in said position of engagement and against axial outward movement by engagement between its other end surface portion and a locking rib extendingf inwardly from an inner diameter portion of said housing.

* * * * *